March 3, 1953 A. C. ROSS 2,629,914
SUSPENSION DEVICE FOR FISHING NETS
Filed April 26, 1950 3 Sheets-Sheet 1
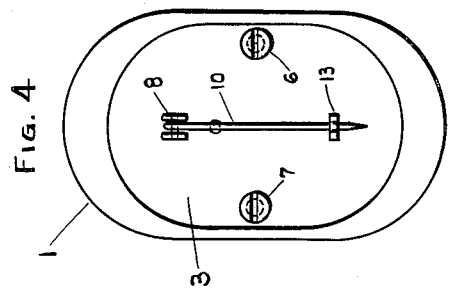
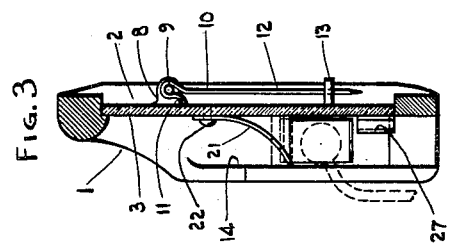
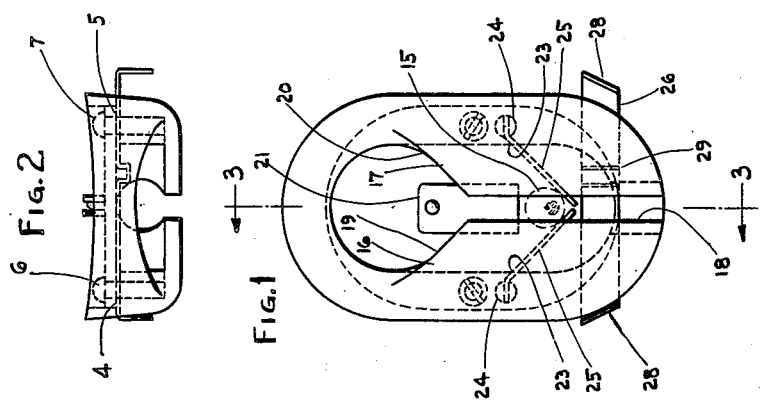
INVENTOR.
Alfred C. Ross
BY Moses, Nolte, Crews + Berry
attorneys March 3, 1953 A. C. ROSS 2,629,914
SUSPENSION DEVICE FOR FISHING NETS
Filed April 26, 1950 3 Sheets-Sheet 2
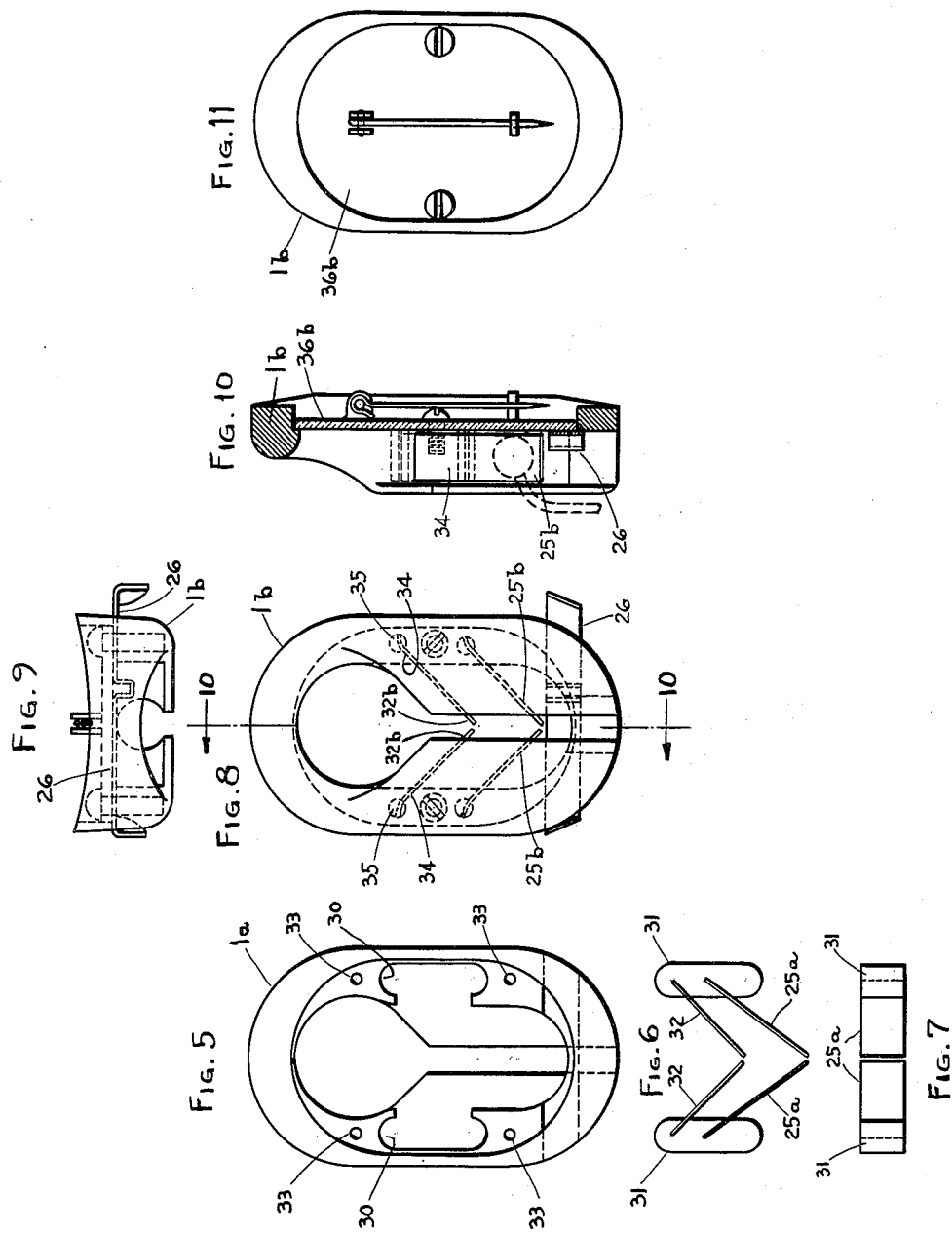
INVENTOR.
Alfred C. Ross
BY
Moses, Nolte, Owe & Berry
Attorneys March 3, 1953　　　　　A. C. ROSS　　　　　2,629,914
SUSPENSION DEVICE FOR FISHING NETS Filed April 26, 1950　　　　　　　　　　　3 Sheets-Sheet 3

INVENTOR.
Alfred C. Ross

Patented Mar. 3, 1953

2,629,914

UNITED STATES PATENT OFFICE 2,629,914

SUSPENSION DEVICE FOR FISHING NETS

Alfred C. Ross, Jackson Heights, N. Y.

Application April 26, 1950, Serial No. 158,160

5 Claims. (Cl. 24—230)

This invention relates to suspension devices for fish landing nets and is in the nature of an improvement upon the invention disclosed and claimed in my pending application Serial No. 99,379, filed June 16, 1949, for Foldable Fishing Net.

In the application referred to, the collapsible fishing net was provided with a hanger which included a narrow neck and an enlargement or head at the free end thereof. One of the features disclosed and claimed in said application was a suspending device attachable to a garment of the user and in which the hanger head was adapted to be trapped until the fishing net was needed for use. The application discloses several forms of suspension devices, each comprising a body having an undercut passage open at the top and front but closed at the bottom, so that the hanger head inserted from the top of the passage had to be withdrawn through the top of the passage. Accidental dislodgment of the hanger head from the passage was interfered with either by making the passage tortuous or by providing a spring which would yieldingly oppose such upward movement.

It is an object of the present invention to provide an improved suspension device in which the fishing net can be released by a downward pull, but in which it is normally restrained against both downward and upward movement.

It is a feature of the invention that the suspension device comprises a body formed with an undercut channel which is open at the front, bottom and top, together with movable arresting means normally obstructing the passage to oppose downward withdrawal of the hanger head.

It is a further feature of the invention that the suspension device additionally includes spring means adapted to pass the hanger head in a downward direction but automatically operable to positively prevent upward movement of the hanger head once it has moved downward far enough to clear the spring means.

It is still another feature of the invention, in accordance with certain of the embodiments thereof, that the arresting means for normally opposing downward withdrawal comprises spring means for yieldingly opposing such withdrawal in combination with a shiftable or movable stop for positively opposing such withdrawal. With this combination, there is no possibility of the fishing net becoming accidentally detached so long as the stop is maintained in obstructing position, nor of its falling away from the suspension device upon the mere shifting or movement of the stop to non-obstructing position.

Other objects and advantages will hereinafter appear.

In the drawing forming part of this specification:

Figure 1 is a view in front elevation of a suspension device embodying features of the invention, the head and a portion of the neck of the net hanger being drawn in in dotted outline;

Figure 2 is a plan view of the structure illustrated in Figure 1 without the head and neck of the net hanger illustrated;

Figure 3 is a sectional view taken upon the section line 3—3 of Figure 1, looking in the direction of the arrows;

Figure 4 is a view in rear elevation of the suspension device of Figures 1 to 3;

Figure 5 is a view in rear elevation showing a modified form of the front body member adapted to receive spring-carrier inserts;

Figure 6 is a view showing the inserts and the springs carried by them in the relative positions which they would occupy when associated with the body member of Figure 5;

Figure 7 is a plan view showing the springs and inserts in Figure 6 in the same relation in which they are shown in Figure 6;

Figure 8 is a view in front elevation of a further modified form of suspension device;

Figure 9 is a plan view of the suspension device of Figure 8;

Figure 10 is a sectional view taken upon the line 10—10 of Figure 8, looking in the direction of the arrows;

Figure 11 is a view in rear elevation of the suspension device of Figures 8 to 10;

Figure 12:
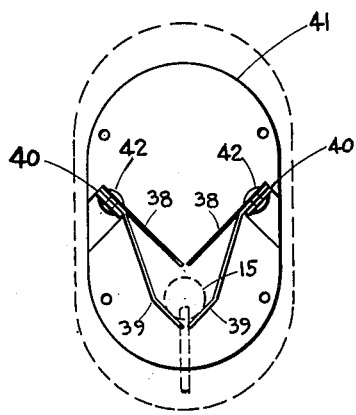
Figure 12 is a view in rear elevation of a further modified form of suspension device showing the body and head and neck of the net hanger in dotted lines.

The suspension device of Figures 1 to 4 comprises two principal body members designated generally as 1 and 2. These members are desirably composed of plastic material, such as polyethylene, but they may be made of any suitable material. Both members are oblate in form when viewed in front or rear elevation, the member 2 being smaller than the member 1. The member 2 is essentially a flat plate which is fitted into the rear of the member 1 and bears against rearwardly facing shoulder areas 3, 4 and 5 of member 1.

The plate 2 is secured to the body member 1 by headed screws 6 and 7 or by any other suitable means. The plate 2 has rearwardly extending ears 8 which carry a pivot pin 9 upon which an attaching pin 10 is pivotally supported. The pin 10 has a tail portion 11 which bears resiliently against the back of the plate 2, and a body portion 12. The body portion 12 is adapted to be caught in a retaining hook 13 which is carried by the plate 2 and extend rearwardly therefrom. The pin 12 serves to attach the suspension device to a garment of the wearer as, for example, to a coat lapel.

The body member 1 is shaped to provide an undercut passage 14 open at the top, bottom and front, through which the head 15 of the hanger may be passed and in which the head may be trapped. This passage is bounded in part by the plate 2 and in part by front side wall members 16 and 17 of the body member 1. The side wall members extend forward and toward one another but fall short of engagement with one another, being separated by a straight slot or passage 18 which is wide enough to pass the neck of the hanger but not wide enough to pass the head 15. The upper edges 19 and 20 of the wall members 16 and 17 incline downward toward one another so as to provide a flaring mouth portion for guiding the head into the passage 14 and the neck into the passage or slot 18.

A spring 21 is secured upon the forward face of the plate 2 by a fastener 22. The spring 21 is inclined in a downward and forward direction to extend substantially across the passage 14 from rear to front. When the head of the hanger is drawn downward along the passage it cams the spring 21 out of its way. As soon as the head is moved far enough down to clear the spring 21, however, the spring snaps back to the illustrated position (see Figure 3) in which it positively prevents upward withdrawal of the hanger head from the passage 14.

The side portions of the body member 2 are formed with downwardly inclined slots 23 which may be entered from the rear. These slots lead into recesses 24 which are also entered from the rear. Spring means 25 are set in the slots 23 and extend downward across the passage 14 into substantially meeting relation, as shown in Figure 1. The outer ends of the springs 25 are bent, however, and are received in the recesses 24. The bent ends of the springs 25 prevent longitudinal withdrawal of the springs through the slots 23. The springs are covered at the rear by the plate 2 so that they cannot be withdrawn rearwardly after the plate 2 has been secured in place.

The springs 25 are somewhat stiffer than the spring 21 and serve yieldingly to support the head 15 of the hanger against downward movement. The resistance interposed by the springs 25 is not an unyielding one, however, and hence obstructing means of a more positive character is desirably provided in combination with the springs.

For this purpose, a stop, for example, a slide 26 made of metal or other suitable material, is movably mounted, for example, in guideways or channels 27 formed in the body member 1. The plate 2 covers the back of the slide 26 and prevents its withdrawal from the assembly after such plate 2 has been secured in place. The slide member 26 includes appropriately formed end members 28 which serve as adjusting handles and stops to limit movement of slide 26. It also includes a protruding rib or boss 29 which extends forward from the main body plane of the member 26 to obstruct downward movement of the hanger head 15. In the position illustrated in Figures 1 and 2, the boss 29 is in non-obstructing position. When the slide 26 is moved to its opposite limit of movement, however, the boss 29 stands substantially beneath the vertex of the angle formed by the springs 25, 25, so that the hanger head cannot move downward past it.

When the fisherman is travelling from one location to another through brush or woods, after he has placed the net upon suspension device, with the head 15 lodged below the spring 21 and resting upon the springs 25, 25, he sets the slide 26 in an obstructing position to prevent accidental and forcible withdrawal of the net from the suspension device. The slide 26 is incorporated to prevent untoward or unintentional withdrawal such as by branches of brush, bushes and the like. In this obstructing position with the head 15 lodged below spring 21, and resting upon the springs 25, 25, the head 15 is prevented by the boss 29 of the slide 26 from spreading the springs 25, 25 more than a short distance apart. When the fisherman reaches a body of water and before he commences fishing, he sets the slide 26 in a non-obstructing position, so that the net is always quickly available for withdrawal from the suspension device. The netting operation should not be hindered by the necessity for shifting the slide, and that is why he sets the slide 26 in non-obstructing position before he commences fishing. Springs 25, 25 have sufficient resistance to sustain the hanger head 15 and yieldingly prevent detachment of the hanger from the suspension device while fishing. When a fisherman has the fish under control and is about to land it, he reaches up with his free hand, grasps the handle of the net, and gives a downward pull, thus pulling the head 15 past the springs 25, 25 and causing the head 15 to emerge from the suspension device, out of the lower end of the passage 14.

The form of the invention illustrated in Figure 5 is generally like the form of Figures 1 to 4. Corresponding reference characters have accordingly been applied to corresponding parts with the subscript "a" added in each instance, and the description will be confined to the features which differentiate the construction from that of Figures 1 to 4.

The frame member 1a is generally like the frame member 1 of Figure 5, but it differs in that it is provided with recesses 30 in its rear face for the insertion of body insert blocks 31. Each of the insert blocks 31 has molded or imbedded in it two springs 32 and 25a. The blocks 31 with the springs 32 and 25a applied to them are set in the recesses 30 from the rear and are then covered with the cover plate 36. The cover plate 36 is in all respects like plate 2 of Figures 3 and 4, save that there are no springs attached to it and is held to body member 1a by means of screws or other suitable fastening means. Bores 33 for receiving the screws in the member 1a are shown in Figure 5.

The springs 32 of Figures 5 to 7 perform the same function as the spring 21 of Figures 1 to 4. The springs 25a of Figures 5 to 7 perform the same function as the springs 25 of Figures 1 to 4.

The modification of Figures 8 to 11 is generally the same as the construction illustrated in Figures 1 to 4. Corresponding reference characters have been applied to corresponding parts with subscript "b" added in each instance and the description will be confined to the features of difference.

In Figure 8, springs 25b, 25b are mounted and retained in slots 23b and recesses 24b in the same manner, and perform the same function as springs 25, 25 shown in Figure 1.

Springs 32b are similarly mounted and retained in slots 34 and recesses 35. Springs 32b perform the same function as the spring 21 of Figures 1 and 3, and the springs 32 of Figures 6 and 7.

Springs 32b and 25b are covered with cover plate 36b as seen in Figures 10 and 11.

In Figure 12, springs 38, 38 and 39, 39 perform the same function as springs 32b, 32b and 25b, 25b, respectively, of Figure 8. Springs 38, 38 and 39, 39 are, however, mounted differently in that they are secured in common by suitable means, for example, rivets 42, on lugs 40, the lugs being integral with the cover plate 41. The cover plate 41 is formed of sheet metal so that the lugs may be struck and folded from it.

The common mounting of springs 38, 38 and 39, 39 may also be accomplished in a manner similar to the spring mounting shown in Figure 6, adapted for introduction in recesses 30 as seen in Figure 5.

In Figure 12, hanger head 15 is placed in a position similar to that shown in Figure 1. Springs 38, 38 and 39, 39 have the same purpose and function as spring 21 and springs 25, 25 in Figure 1.

Figure 13:
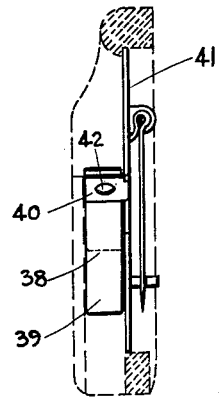
Figure 13 is a side elevation of the suspension device shown in Figure 12.

Figure 13 is a side elevation showing relationship of cover plate 41 to the body member which body member is the same in all respects as body member 1a seen in Figure 5.

I have described what I believe to be the best embodiments of my invention. I do not wish, however, to be confined to the embodiments shown, but what I desire to cover by Letters Patent is set forth in the appended claims.

I claim:

1. A suspension device for a fish landing net having a hanger which includes a narrow neck and an enlargement or head at the free end thereof, said suspension device comprising a body formed with an undercut passage open at the front, top and bottom, through which the head of the hanger may be passed and in which it may be trapped until the net is needed, spring means carried by the body and extending downward across the passage in position to be cammed aside by the head as the hanger is moved downward but adapted to spring back into position to prevent reverse movement of the head when cleared by the head, and movable arresting means normally obstructing the passage to oppose downward withdrawal of the hanger head.

2. A suspension device for a fish landing net having a hanger which includes a narrow neck and an enlargement or head at the free end thereof, said suspension device comprising a body formed with an undercut passage open at the front, top and bottom, through which the head of the hanger may be passed and in which it may be trapped until the net is needed, and spring means extending downward across the passage for yieldingly supporting the hanger against downward withdrawal from the passage.

3. In a device as set forth in claim 2, and a stop mounted for movement between an obstructing position in which it positively prevents downward withdrawal of the hanger head from the passage and a non-obstructing position in which it permits free downward withdrawal of the hanger head.

4. A suspension device for a fish landing net having a hanger which includes a narrow neck and an enlargement or head at the free end thereof, said suspension device comprising a body formed with an undercut passage open at the front, top and bottom, through which the head of the hanger may be passed and in which it may be trapped until the net is needed, spring means extending downward across the passage for yieldingly supporting the hanger against downward withdrawal from the passage, and a stop mounted for movement between an obstructing position in which it positively prevents downward withdrawal of the hanger head from the passage and a non-obstructing position in which it permits downward withdrawal of the hanger head from the passage.

5. A suspension device for a fish landing net having a hanger which includes a narrow neck and an enlargement or head at the free end thereof, said suspension device comprising a body formed with an undercut passage open at the front, top and bottom, through which the head of the hanger may be passed and in which it may be trapped until the net is needed, spring means carried by the body and extending downward across the passage in position to be cammed aside by the head as the hanger is moved downward but adapted to spring back into position to prevent reverse movement of the head when cleared by the head, further spring means extending downward across the passage for yieldingly supporting the hanger against downward withdrawal from the passage, and a stop mounted for movement between an obstructing position in which it positively prevents downward movement of the hanger head past the second spring means and a non-obstructing position in which it permits the hanger head to be forced downward past the second spring means and to be withdrawn downward from the passage.

ALFRED C. ROSS.

REFERENCES CITED

The following references are of record in the file of this patent:

UNITED STATES PATENTS

| Number | Name | Date |
|---|---|---|
| 381,833 | Fried | Apr. 24, 1888 |
| 448,946 | Everiss | Mar. 24, 1891 |
| 634,091 | Newlee | Oct. 3, 1899 |
| 681,392 | Fugate | Aug. 27, 1901 |
| 747,709 | Hoffmann | Dec. 22, 1903 |
| 1,068,273 | Reed | July 22, 1913 |
| 1,192,733 | Bennett | July 25, 1916 |
| 1,484,991 | Jalbert | Feb. 26, 1924 |
| 1,783,119 | Hacking | Nov. 25, 1930 |
| 2,176,960 | Fridolph | Oct. 24, 1939 |
| 2,212,756 | Stewart | Aug. 27, 1940 |
| 2,323,197 | Brice | June 29, 1943 |
| 2,455,765 | Harvey | Dec. 7, 1948 |
| 2,455,929 | Hattan | Dec. 14, 1948 |
| 2,455,968 | Baker | Dec. 14, 1948 |

FOREIGN PATENTS

| Number | Country | Date |
|---|---|---|
| 87,236 | Switzerland | Nov. 16, 1920 |